(12) United States Patent
Song

(10) Patent No.: US 12,260,325 B2
(45) Date of Patent: Mar. 25, 2025

(54) APPARATUS AND METHOD WITH NEURAL NETWORK MODEL RECONFIGURATION

(71) Applicant: Samsung Electronics Co., Ltd., Suwon-si (KR)

(72) Inventor: Uiseok Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 788 days.

(21) Appl. No.: 16/924,297

(22) Filed: Jul. 9, 2020

(65) Prior Publication Data

US 2021/0216864 A1 Jul. 15, 2021

(30) Foreign Application Priority Data

Jan. 15, 2020 (KR) ........................ 10-2020-0005098

(51) Int. Cl.
*G06N 3/08* (2023.01)
*G06F 9/50* (2006.01)

(52) U.S. Cl.
CPC ................ *G06N 3/08* (2013.01); *G06F 9/50* (2013.01)

(58) Field of Classification Search
CPC ...... G06N 3/08; G06N 3/0445; G06N 3/0454; G06N 3/063; G06N 3/0481; G06N 3/082;
(Continued)

(56) References Cited

U.S. PATENT DOCUMENTS

| | | | |
|---|---|---|---|
| 2016/0379137 A1 | 12/2016 | Burger et al. | |
| 2019/0244086 A1* | 8/2019 | Franca-Neto | G06V 10/82 |
| 2020/0394520 A1* | 12/2020 | Kruglov | G06N 3/045 |

FOREIGN PATENT DOCUMENTS

| | | |
|---|---|---|
| EP | 3 451 293 A1 | 3/2019 |
| JP | 5-108595 A | 4/1993 |

(Continued)

OTHER PUBLICATIONS

Tu et al., Deep Convolutional Neural Network Architecture with Reconfigurable Computation Patterns, IEEE Transactions on Very Large Scale Integration (VLSI) Systems vol. 25, No. 8, (2017), 2220-2233 (Year: 2017).*

(Continued)

*Primary Examiner* — Van C Mang
(74) *Attorney, Agent, or Firm* — NSIP Law

(57) ABSTRACT

A processor-implemented neural network model reconfiguration method is provided. The method calculates required resource information of each of a plurality of layers of a neural network model, determines whether a layer of the plurality of layers is a reconfiguration target layer based on the required resource information and hardware information, determines reconfiguration layers, with respect to the reconfiguration target layer, based on required resource information of the reconfiguration target layer and the hardware information, selects one of the reconfiguration target layer and the determined reconfiguration layers based on performance information of the reconfiguration target layer and performance information of each of the determined reconfiguration layers, and implements one of the determined reconfigured layers in the neural network model based on the selecting of the determined reconfiguration layers.

14 Claims, 14 Drawing Sheets

(58) Field of Classification Search
CPC .......... G06N 3/04; G06N 3/044; G06N 3/045; G06N 3/048; G06F 9/50
See application file for complete search history.

(56) References Cited

FOREIGN PATENT DOCUMENTS

| KR | 10-2019-0030034 A | 3/2019 |
|---|---|---|
| KR | 10-2019-0036317 A | 4/2019 |

OTHER PUBLICATIONS

Liu et al., MetaPruning: Meta Learning for Automatic Neural Network Channel Pruning, Proceedings of the IEEE/CVF International Conference on Computer Vision (ICCV), (2019) 3296-3305 (Year: 2019).*

Zhang et al., SDChannelNets: Extremely Small and Efficient Convolutional Neural Networks, IEICE Trans. Inf. & Syst., vol. E102-D, No. 12, 2019, 2646-2650 (Year: 2019).*

Ma et al. "An automatic RTL compiler for high-throughput FPGA implementation of diverse deep convolutional neural networks." 2017 27th International Conference on Field Programmable Logic and Applications (FPL). IEEE (2017) 1-8 (Year: 2017).*

Hasan et al., "MulMapper: towards an automated FPGA-Based CNN processor generator based on a dynamic design space exploration." 2019 IEEE International Symposium on Circuits and Systems (ISCAS). IEEE, 2019, 1-5 (Year: 2019).*

Meyer et al., "Efficient convolutional neural network for audio event detection." arXiv preprint arXiv:1709.09888 (2017) 1-5 (Year: 2017).*

Siu, et al. "Memory requirements for convolutional neural network hardware accelerators." 2018 IEEE International Symposium on Workload Characterization (IISWC). IEEE, 2018. (Year: 2018).*

He et al., "Channel pruning for accelerating very deep neural networks." Proceedings of the IEEE international conference on computer vision, 2017, 1389-1397 (Year: 2017).*

Mougy et al.—"Reconfigurable Wireless Networks"—https://ieeexplore.ieee.org/stamp/stamp.jsp?tp=&arnumber=7109098 (Year: 2015).*

Kastner et al.—"Hardware/Software Codesign for Convolutional Neural Networks exploiting Dynamic Partial Reconfiguration on PYNQ"—https://ieeexplore.ieee.org/stamp/stamp.jsp?tp=&arnumber=8425398 (Year: 2018).*

Khalil et al.—"A Novel Reconfigurable Hardware Architecture of Neural Network"—2019—https://ieeexplore.ieee.org/stamp/stamp.jsp?tp=&arnumber=8884809 (Year: 2019).*

Putic et al.—"DyHard-DNN: Even More DNN Acceleration with Dynamic Hardware Reconfiguration"—2018—https://ieeexplore.ieee.org/stamp/stamp.jsp?tp=&arnumber=8465873 (Year: 2018).*

Xie, Saining et al., "Aggregated Residual Transformations for Deep Neural Networks." *In Proceedings of the IEEE conference on computer vision and pattern recognition*, 2017 (pp. 1492-1500).

Vaswani, Ashish et al., "Attention Is All You Need." *31st Conference on Neural Information Processing Systems (NIPS 2017)*, 2017 (pp. 1-11).

Wu, Bichen et al., "FBNet: Hardware-Aware Efficient ConvNet Design via Differentiable Neural Architecture Search." *In Proceedings of the IEEE Conference on Computer Vision and Pattern Recognition*, 2019 (pp. 10734-10742).

\* cited by examiner

FIG. 4A

Convolutional layer information:

| | Iteration | Number of input channels | Input height | Input width | Number of bits | Number of kernels | Number of kernel channels | Kernel height | Kernel width | Number of bits |
|---|---|---|---|---|---|---|---|---|---|---|
| First sublayer | 3 | 1024 | 14 | 14 | 8 | 512 | 1024 | 1 | 1 | 8 |
| Second sublayer | 3 | 512 | 7 | 7 | 8 | 512 | 512 | 3 | 3 | 8 |
| Third sublayer | 3 | 512 | 7 | 7 | 8 | 2048 | 512 | 1 | 1 | 8 |

Convolutional layer

FIG. 4B

| | Number of required MACs | Number of operation iterations | Input capacity (byte) | Kernel capacity (byte) | Output capacity (byte) | Layer-required capacity (byte) |
|---|---|---|---|---|---|---|
| First sublayer | 1024 | 14×14×3×512 | 602,112 | 524,288 | 301,056 | 1,427,456 |
| Second sublayer | 4608 | 7×7×3×512 | 75,264 | 2,359,296 | 75,264 | 2,509,824 |
| Third sublayer | 512 | 7×7×3×2048 | 75,264 | 1,048,576 | 301,056 | 1,424,896 |

Required operation information | Required capacity information

Convolutional layer

<Core-aware multi-path layer>

| | |
|---|---|
| Iteration | 3 |
| Number of paths | 4 |
| Number of input channels | 512/4-15 |
| Input height | 7 |
| Input width | 7 |
| Number of bits | 8 |
| Number of kernels | 512 |
| Number of kernel channels | 512/4-15 |
| Kernel height | 3 |
| Kernel width | 3 |
| Number of bits | 8 |
| Number of required MACs | 1024 |
| Number of operation iterations | 7×7×3×512 |
| Input capacity (byte) | 75,264 |
| Kernel capacity (byte) | 2,359,296 |
| Output capacity (byte) | 75,264 |
| Layer-required capacity (byte) | 2,509,824 |

FIG. 6B

<Memory-aware multi-path layer>

| | |
|---|---|
| Iteration | 3 |
| Number of paths | 4 |
| Number of input channels | 512/4-15 |
| Input height | 7 |
| Input width | 7 |
| Number of bits | 8 |
| Number of kernels | 512 |
| Number of kernel channels | 512/4-15 |
| Kernel height | 3 |
| Kernel width | 3 |
| Number of bits | 8 |
| Number of required MACs | 1024 |
| Number of operation iterations | 7×7×3×512 |
| Input capacity (byte) | 75,264/4 |
| Kernel capacity (byte) | 2,359,296/4 |
| Output capacity (byte) | 75,264 |
| Per-path required capacity (byte) | 683,904 |
| Layer-required capacity (byte) | 2,509,824 |

FIG. 7B

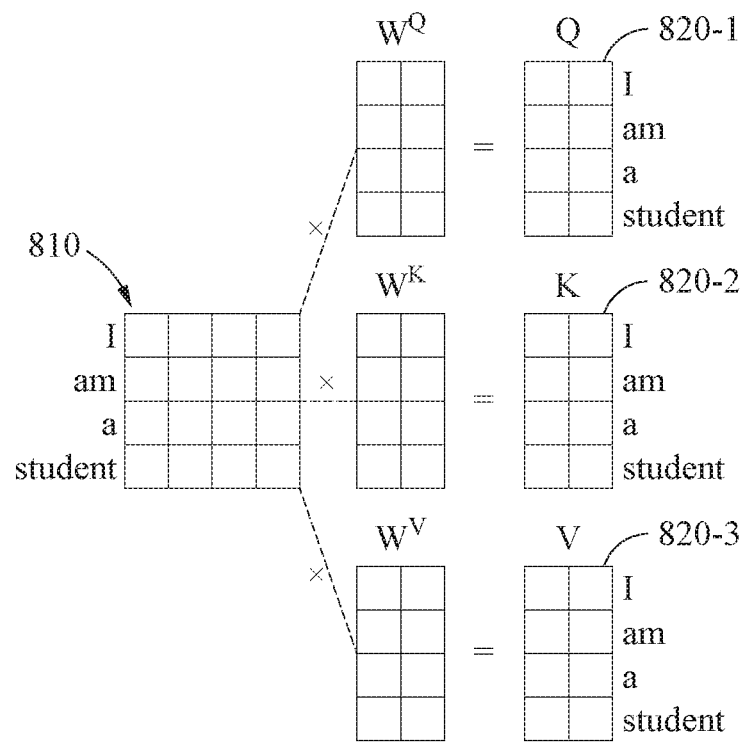
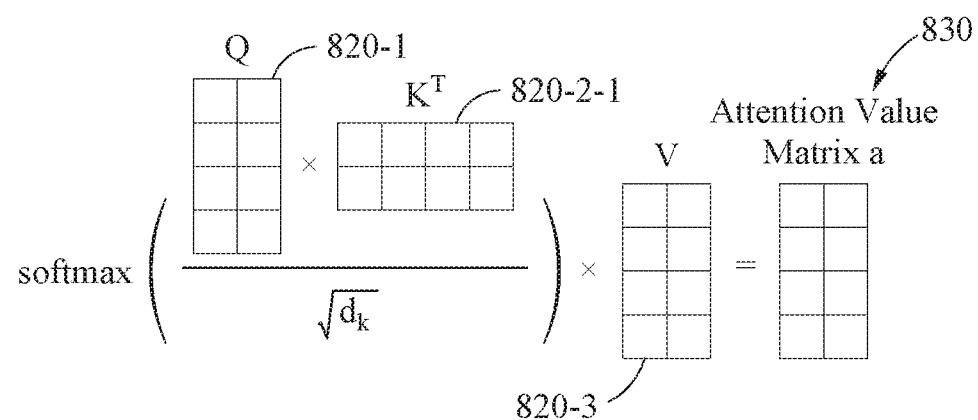
FIG. 8B

APPARATUS AND METHOD WITH NEURAL NETWORK MODEL RECONFIGURATION

CROSS-REFERENCE TO RELATED APPLICATIONS

This application claims the benefit under 35 USC § 119(a) of Korean Patent Application No. 10-2020-0005098 filed on Jan. 15, 2020 in the Korean Intellectual Property Office, the entire disclosure of which is incorporated herein by reference for all purposes.

BACKGROUND

1. Field

The following description relates to an apparatus and method with neural network model reconfiguration.

2. Description of Related Art

Deep neural networks (DNNs) may have different structures based on the tasks to be processed. However, an optimal neural network structure that can efficiently process each task is not currently available. Currently, DNN models may be designed without considering the hardware characteristics necessary to perform the DNN models.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method includes calculating required resource information of each of a plurality of layers of a neural network model; determining whether a layer of the plurality of layers is a reconfiguration target layer based on the required resource information and hardware information; determining reconfiguration layers, with respect to the reconfiguration target layer, based on required resource information of the reconfiguration target layer and the hardware information; selecting one of the reconfiguration target layer and the determined reconfiguration layers based on performance information of the reconfiguration target layer and performance information of each of the determined reconfiguration layers; and implementing one of the determined reconfigured layers in the neural network model based on the selecting of the determined reconfiguration layers.

The determining of the reconfiguration layers may include determining a first reconfiguration layer by applying first multiple paths to the reconfiguration target layer based on required operation information related to the reconfiguration target layer, and processing core information in the hardware information; and determining a second reconfiguration layer by applying second multiple paths to the reconfiguration target layer based on required capacity information related to the reconfiguration target layer, and memory information in the hardware information.

A total number of the first multiple paths may be determined based on the required operation information and a number of processing cores.

The reconfiguration target layer may be a convolutional layer, the first reconfiguration layer is determined by reconfiguring the convolutional layer based on the first multiple paths, and a total number of kernel channels of the first reconfiguration layer is determined based on the number of first multiple paths.

A total number of the second multiple paths may be determined based on the required capacity information and a local memory size.

The reconfiguration target layer may be a convolutional layer, the second reconfiguration layer is determined by reconfiguring the convolutional layer based on the second multiple paths, and a total number of kernel channels of the second reconfiguration layer is determined based on the number of second multiple paths.

The determining of the reconfiguration target layer may include determining a layer among the plurality of layers to be the reconfiguration target layer, when a number of required operators for the determined layer exceeds a number of operators per processing core, or when a product of the number of required operators for the determined layer and a number of operation iterations is not a multiple of the number of operators per processing core.

The selecting may include receiving the performance information of the reconfiguration target layer and the performance information of each of the determined reconfiguration layers from a profiler; comparing the received performance information of the reconfiguration target layer and the received performance information of each of the determined reconfiguration layers; and selecting a layer of the plurality of layers having a greater performance information among the performance information of the reconfiguration target layer and the performance information of each of the determined reconfiguration layers based on a result of the comparing.

The required resource information of each of the plurality of layers may include at least one of required capacity information, and required operation information of each of the plurality of layers, and the hardware information may include information related to at least one piece of hardware that executes the neural network model.

The required operation information of each of the plurality of layers may include at least one of an operation quantity required to perform operations of each of the layers and a number of operators required to calculate a single output value of each of the plurality of layers, and the required capacity information of each of the plurality of layers may include a memory size required to perform operations of each of the plurality of layers.

The hardware information may include any one or any combination of a total number of processing cores included in the at least one piece of hardware, a total number of operators per processing core, and a memory size of the hardware.

In a general aspect, a data processing apparatus includes a first processor configured to reconfigure a neural network model; and a second processor configured to implement the reconfigured neural network model, wherein, for the reconfiguration of the neural network model, the first processor is configured to: calculate required resource information of each of a plurality of layers of the neural network model, determine whether a layer of the plurality of layers is a reconfiguration target layer based on the required resource information and hardware information, determine reconfiguration layers, with respect to the reconfiguration target layer, based on required resource information of the reconfiguration target layer and the hardware information, select one of the reconfiguration target layer and the determined reconfiguration layers based on performance information of the reconfiguration target layer and performance information of each of the determined reconfiguration layers, and implement one of the determined reconfigured layers in the neural network model based on the selecting of the determined reconfiguration layers.

For the determination of the reconfiguration layers, the first processor may be configured to determine a first reconfiguration layer by applying first multiple paths to the reconfiguration target layer based on required operation information related to the reconfiguration target layer, and processing core information in the hardware information, and determine a second reconfiguration layer by applying second multiple paths to the reconfiguration target layer based on required capacity information related to the reconfiguration target layer, and memory information in the hardware information.

A total number of the first multiple paths may be determined based on the required operation information and a total number of processing cores.

The reconfiguration target layer may be a convolutional layer, the first reconfiguration layer is determined by reconfiguring the convolutional layer based on the first multiple paths, and a total number of kernel channels of the first reconfiguration layer may be determined based on the number of first multiple paths.

A total number of the second multiple paths may be determined based on the required capacity information and a local memory size of the second processor.

The reconfiguration layer may be a convolutional layer, the second reconfiguration layer may be determined by reconfiguring the convolutional layer based on the second multiple paths, and a total number of kernel channels of the second reconfiguration layer may be determined based on the number of second multiple paths.

The first processor may be configured to determine a layer among the plurality of layers to be the reconfiguration target layer, when a number of required operators for the determined layer exceeds a total number of operators per processing core, or when a product of the number of required operators for the determined layer and a total number of operation iterations is not a multiple of the number of operators per processing core.

For the selecting, the first processor may be configured to receive the performance information of the reconfiguration target layer and the performance information of each of the determined reconfiguration layers from a profiler, compare the received performance information of the reconfiguration target layer and the received performance information of each of the determined reconfiguration layers, and select a layer of the plurality of layers having a greater performance information among the performance information of the reconfiguration target layer and the performance information of each of the determined reconfiguration layers based on a result of the comparing.

The required resource information may include at least one of required capacity information, and required operation information of each of the plurality of layers.

Other features and aspects will be apparent from the following detailed description, the drawings, and the claims.

BRIEF DESCRIPTION OF DRAWINGS

FIGS. 4A through 7B illustrate example operations of a NN model reconfiguration apparatus, in accordance with one or more embodiments.

FIGS. 8A and 8B illustrate example operations of a NN model reconfiguration apparatus, in accordance with one or more embodiments.

Figure 1A:
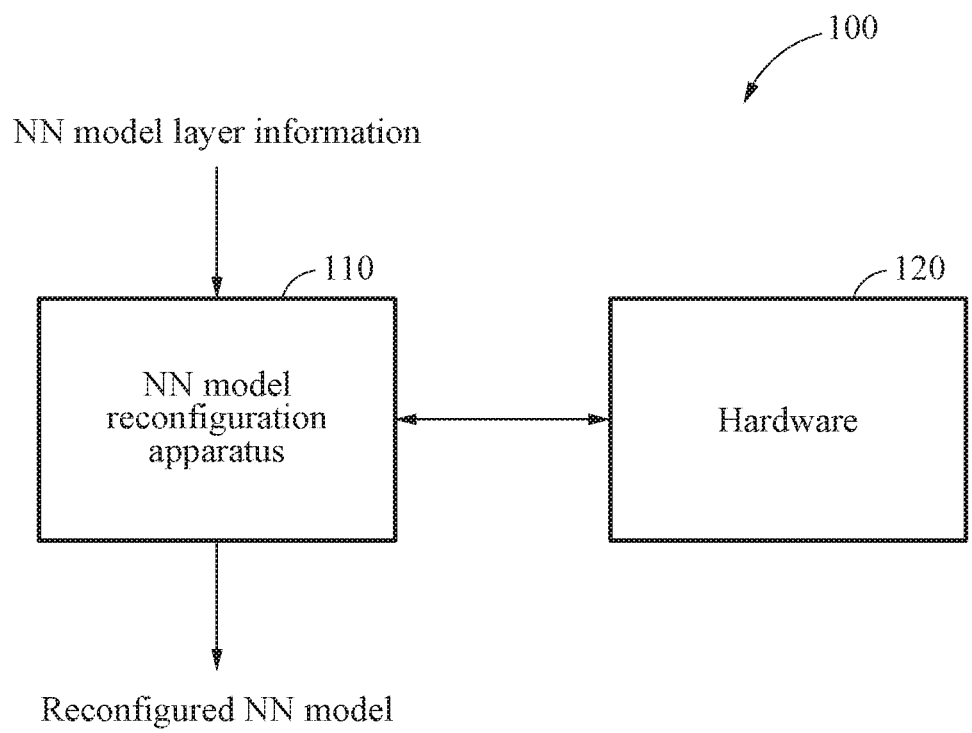
FIGS. 1A and 1B illustrate an example neural network model system, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Figure 1B:
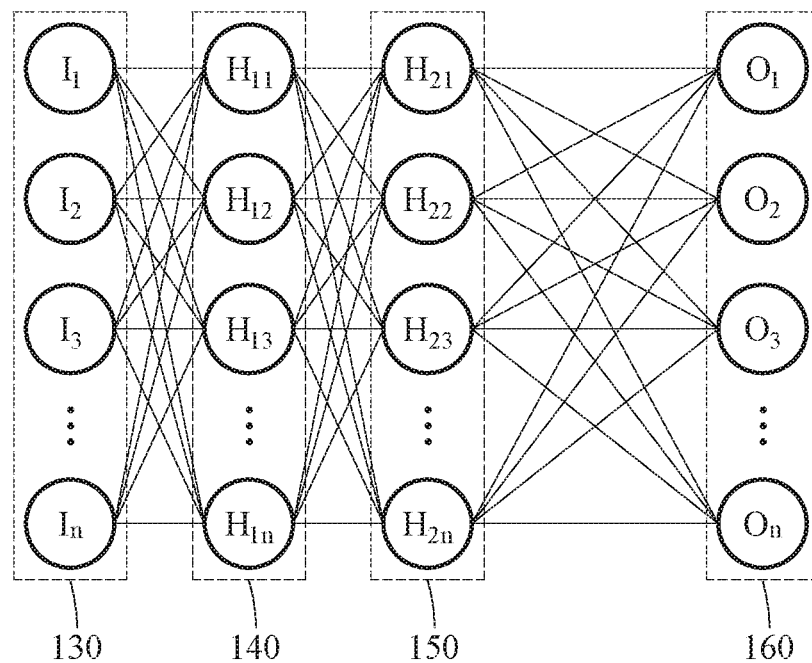

FIGS. 1A and 1B illustrate an example neural network model system, in accordance with one or more embodiments.

Referring to FIG. 1A, a neural network (NN) model system 100 may include a NN model reconfiguration apparatus 110 and hardware 120. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

In a non-limiting example, the NN model system 100 may be implemented as, or in, a server. In an example, the NN model system implemented as, or in, the server may perform object recognition, speech recognition, pattern recognition, computer vision, machine translation, and classification, as only examples. In another example, the NN model system 100 may be implemented as, or in, a mobile terminal (for example, a smart phone, a tablet PC, and similar devices). Technological automation of object recognition, speech recognition, pattern recognition, computer vision, machine translation, and classification or analyses, for example, has been implemented through processor implemented neural network models, as specialized computational architectures, that after substantial training may provide computationally intuitive mappings between input patterns and output patterns or pattern recognitions of input patterns. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

The hardware 120 may execute a NN model. Additionally, the hardware 120 executes a NN model reconfigured by the NN model reconfiguration apparatus 110. The hardware 120 includes, for example, at least one processor. The processor includes, for example, a central processing unit (CPU), a graphics processing unit (GPU), and a neural processing unit (NPU).

An example NN model is illustrated in FIG. 1B.

Referring to FIG. 1B, the NN model may include a plurality of layers 130, 140, 150, and 160. The NN model in the example of FIG. 1B may be a deep neural network (DNN) model. In the example of FIG. 1B, the layer 130 may correspond to an input layer, the layers 140 and 150 may correspond to hidden layers, and the layer 160 may correspond to an output layer. The layers 130, 140, 150, and 160 may each include a plurality of nodes (or artificial neurons). Each node is a unit of calculation with at least one input and an output, and nodes are connected to each other. Briefly, such reference to "neurons" is not intended to impart any relatedness with respect to how the neural network architecture computationally maps or thereby intuitively recognizes information, and how a human's neurons operate. In other words, the term "neuron" is merely a term of art referring to the hardware implemented nodes of a neural network, and will have a same meaning as a node of the neural network.

In an example, the DNN may be one or more of a fully connected network, a convolution neural network, a recurrent neural network, an attention network, a self-attention network, and the like, or may include different or overlapping neural network portions respectively with such full, convolutional, or recurrent connections, according to an algorithm used to process information. The neural network 100 may be configured to perform, as non-limiting examples, computer vision, machine translation, object classification, object recognition, speech recognition, pattern recognition, voice recognition, and image recognition by mutually mapping input data and output data in a nonlinear relationship based on deep learning. Such deep learning is indicative of processor implemented machine learning schemes for solving issues, such as issues related to automated image or speech recognition from a data set, as non-limiting examples.

The input layer 130 may include one or more nodes $I_1$ to $I_n$ into which data may be directly input, not through a link in a relationship with other nodes. The output layer 160 may include one or more nodes $O_1$ to $O_n$ which do not have an output node in a relationship with other nodes. The hidden layers 140 and 150 may correspond to other layers of the DNN model excluding the input layer 130 and the output layer 160. The hidden layers 140 and 150 may include nodes $H_{11}$ to $H_{1m}$ and $H_{21}$ to $H_{2m}$ corresponding to input nodes or output nodes in a relationship with other nodes. The DNN model shown in FIG. 1B is provided as an example for ease of description, and thus the structure of the DNN model does not limit the scope of the examples. The DNN model used in the example may be provided in various structures.

The number of hidden layers included in the DNN model, the number of nodes included in each layer, and/or the connection between nodes may vary depending on an example.

In an example, an output of a node included in a layer may be input into one or more nodes of another layer. For example, an output of the node 11 included in the input layer 130 may be transferred to at least one node of the hidden layer 140. The nodes are connected to each other by "links" or weighted connections, and nodes connected by such links may form relative relationships between an input node and an output node. The concept of an input node and an output node is relative, and a predetermined node which is an output node in the relationship with a node may be an input node in the relationship with another node, and vice versa.

In the DNN that includes a plurality of layers, a later layer of adjacent layers may receive a value obtained by multiplying a connection weighted by an output value of a relatively lower layer, or a previous layer by a connection weight, and applying a bias thereto, and outputs a certain operation or activation value, and the output value may be applied to another higher or subsequent layer adjacent to the layer in a similar manner, e.g., as an input.

Thus, the connection weight may be set for a link between nodes. For example, a connection weight may be set for a link between the node $I_1$ and the node $H_{11}$. There may be connection weighted links between nodes of the input layer and a hidden layer, each of the hidden layers, and between a hidden layer and the output layer. The connection weight may be adjusted or changed during training. DNN models that have different connection weights may have or exhibit different characteristics. The connection weight may amplify, reduce, or maintain a relevant data value, thereby determining a degree of influence of the data value on a final result. The connection weights are parameters of the DNN model. The above DNN models may be implemented through computer-executable code or instructions that when executed by a hardware device, for example, a computer system, configure the hardware device to implement the neural network.

In a relationship of an input node and an output node connected through such a link, an output value of the output node may be determined based on data input into the input node and a connection weight of the link between the input node and the output node. For example, if one or more input nodes are connected to a single output node by respective links, an output value of the output node may be determined based on input values input into the one or more input nodes and connection weights of the links between the one or more input nodes and the output node.

An output of an activation function associated with weighted inputs of a node included in a previous layer may be input to each of plural or all nodes included in a subsequent layer, e.g., hidden layer 130. Each node included in the hidden layers 140 and 150 may receive an output of an activation function related to weighted inputs of the nodes included in a previous layer. The weighted inputs may be obtained by multiplying inputs of the nodes included in the previous layer by respective connection weights. The activation function corresponds to, as non-limiting examples, a sigmoid, a hyperbolic tangent (tanh), or a rectified linear unit (ReLU). The weighted inputs of the nodes included in a previous layer may be input into each node included in the output layer 160. A process of inputting weighted data from a predetermined layer to the next layer is referred to as propagation.

Referring back to FIG. 1A, the NN model reconfiguration apparatus 110 may reconfigure the NN model based on information related to the layers of the NN model. The NN model reconfiguration apparatus 110 may determine a plurality of reconfiguration layers corresponding to one or more layers included in the NN model based on information related to the hardware 120. In this example, each reconfiguration layer may include one or more paths or branches. The NN model reconfiguration apparatus 110 may select at least one from among the existing layers and the reconfiguration layers. In this example, if one of the reconfiguration layers is selected, the NN model reconfiguration apparatus 110 may apply the selected reconfiguration layer to the NN model. Accordingly, the NN model may be reconfigured.

Since the reconfigured NN model may reflect the characteristics of the hardware 120, the hardware utilization may be improved, and the performance of the NN model system 100 may be further improved.

Figure 2:
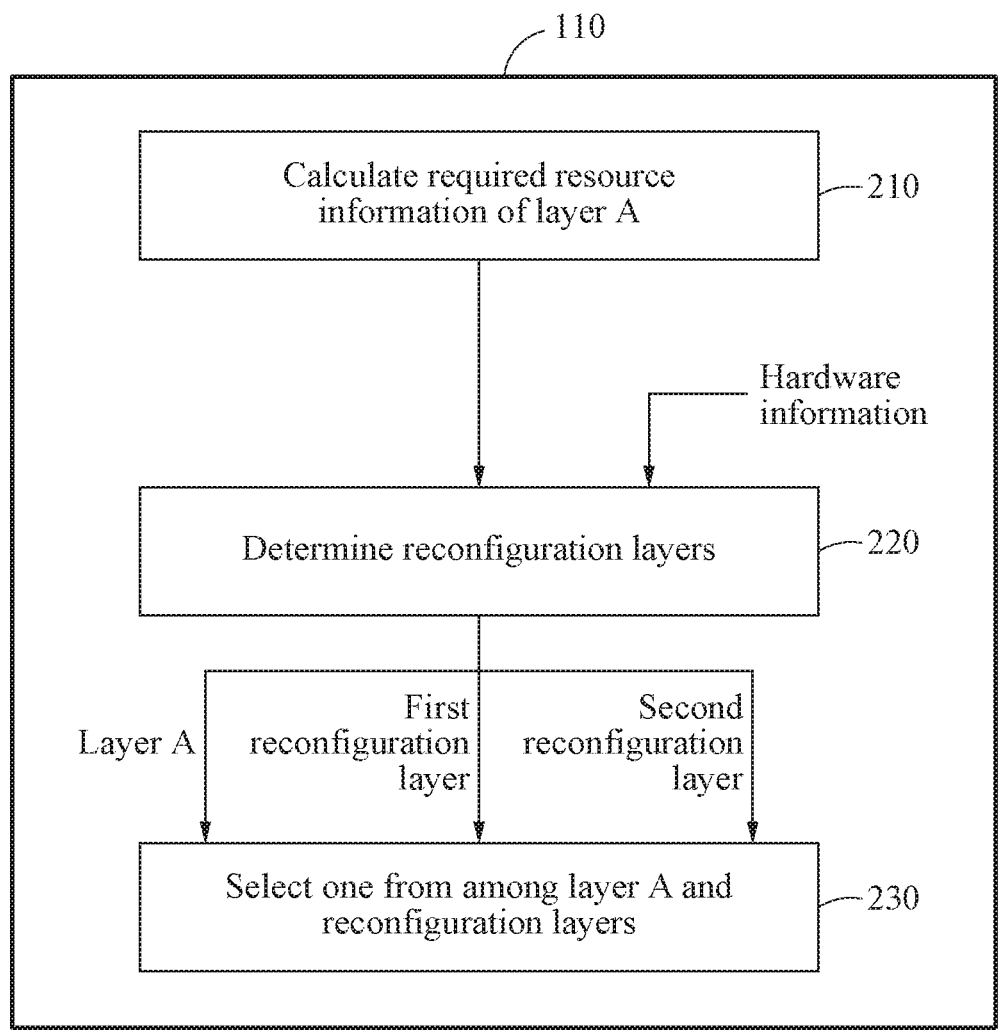
FIGS. 2 and 3 illustrate example operations of a neural network (NN) model reconfiguration apparatus, in accordance with one or more embodiments.
Figure 3:
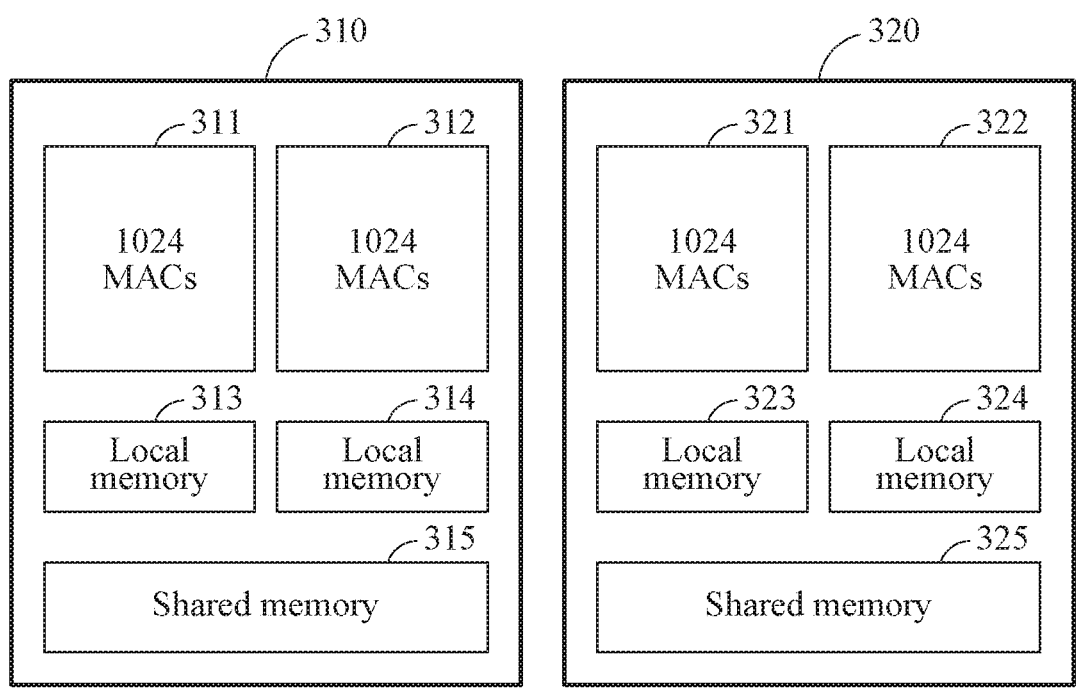

FIGS. 2 and 3 illustrate example operations of a NN model reconfiguration apparatus, in accordance with one or more embodiments.

Referring to FIG. 2, in operation 210, the NN model reconfiguration apparatus 110 calculates required or relevant resource information of a layer A of a NN model. The required resource information may include, as a non-limiting example, at least one of required operation information and required capacity information of the layer A. The required operation information may include, as an example, at least one of an operation quantity required to perform the layer A and the number of operators required to calculate a single output value of the layer A. However, examples are not limited thereto. The required capacity information may include, for example, a memory size (or a memory usage) required to perform the layer A operation. However, examples are not limited thereto.

The required resource information will be described further below.

In operation 220, the NN model reconfiguration apparatus 110 determines reconfiguration layers corresponding to the layer A based on the calculated required resource information and hardware information. The hardware information may include, as non-limiting examples, processing core information and memory information in the hardware 120. For example, the hardware 120 may include processors 310 and 320 of FIG. 3. However, examples are not limited thereto. In the example of FIG. 3, the processor 310 includes processing cores 311 and 312, local memories 313 and 314, and a shared memory 315, and the processor 320 includes processing cores 321 and 322, local memories 323 and 324, and a shared memory 325. Although not shown in FIG. 3, each of the processors 310 and 320 may further include a global memory. In the example of FIG. 3, the hardware information input into the NN model reconfiguration apparatus 110 includes any one or any combination of the number of processing cores, the number of multiply accumulators (MACs) per processing core, a memory hierarchy structure, a local memory size, a global memory size, and a shared memory size.

In some examples, the hardware 120 may include one or more processors. In other examples, the hardware 120 may be a mainboard.

In operation 220 of FIG. 2, the NN model reconfiguration apparatus 110 may determine a first reconfiguration layer by applying first multiple paths to the layer A based on the required operation information of the layer A and the processing core information of the hardware 120. In this example, the number of first multiple paths may be determined based on the required operation information of the layer A and the number of processing cores in the hardware 120. Since the first reconfiguration layer considers or reflects the processing core information of the hardware 120, the first reconfiguration layer is also referred to as a core-aware multi-path layer. Further, the NN model reconfiguration apparatus 110 determines a second reconfiguration layer by applying second multiple paths to the layer A based on the required capacity information of the layer A and the memory (for example, local memory, cache memory, or scratchpad memory) information of the hardware 120. In this example, the number of second multiple paths may be determined based on the required capacity information of the layer A and the local memory size (or cache memory size, or scratchpad memory size) of the hardware 120. Since the second reconfiguration layer considers or reflects the memory information of the hardware 120, the second reconfiguration layer is also referred to as a memory-aware multi-path layer.

In a non-limiting example, the layer A is a convolutional layer or a self-attention layer. The operation of the NN model reconfiguration apparatus 110 when the layer A is a convolutional layer will be described below with reference to FIGS. 4A through 7B. The operation of the NN model reconfiguration apparatus 110 when the layer A is a self-attention layer will be described below with reference to FIGS. 8A and 8B. The convolutional layer or the self-attention layer described above is merely an example of the layer A, and the layer A is not limited to the convolutional layer or the self-attention layer.

In operation 230, the NN model reconfiguration apparatus 110 selects one from among the layer A and the reconfiguration layers. That is, the NN model reconfiguration apparatus 110 selects one from among the existing layer and the reconfiguration layers. For example, the NN model reconfiguration apparatus 110 selects one from among the layer A and the reconfiguration layers based on performance information of the layer A and performance information of each of the reconfiguration layers, which will be described further below with reference to FIG. 9.

If one of the reconfiguration layers is selected, the NN model reconfiguration apparatus 110 applies the selected reconfiguration layer to the NN model. That is, the NN model reconfiguration apparatus 110 applies the selected reconfiguration layer to the NN model, instead of the existing layer. In an example, in response to the evaluation showing that the first reconfiguration layer has the highest performance, among the layer A, the first reconfiguration layer, and the second reconfiguration layer, the NN model reconfiguration apparatus 110 selects the first reconfiguration layer and applies the selected first reconfiguration layer to the NN model.

The NN model reconfiguration apparatus 110 performs the operations described with reference to FIGS. 2 and 3 with respect to one or more other layers of the NN model.

The NN model reconfiguration apparatus 110 stores the reconfigured NN model. In other words, the NN model reconfiguration apparatus 110 stores the NN model that includes one or more reconfigured layers. When the reconfigured NN model is executed on the hardware 120, the MACs and/or the memory of the hardware 120 is used to the maximum. Thus, the performance of the NN model system 100 may improve. For example, multiple paths are applied to the layers constituting the NN model, such that data moved between memories are reduced or the processor is used efficiently. As a result, a time (or latency) for performing the NN model may be reduced. Further, the accuracy (for example, top-1 error) may also improve.

In an example, the reconfigured NN model may be trained. For example, a training apparatus in the NN model system 100 may train the reconfigured NN model. Thus, the reconfigured NN model may be optimized.

Referring to FIGS. 4A to 7B, it may be assumed that a described NN model includes convolutional layers, and may be executed by the processors 310 and 320 of FIG. 3, as non-limiting examples.

FIG. 4A illustrates information of each of first to third sublayers included in a convolutional layer of the NN model, and FIG. 4B illustrates required operation information and required capacity information of each of the first to third sublayers.

In the example of FIG. 4A, the information of each of the first to third sublayers may include, as non-limiting examples, an iteration count, the number of input channels, an input height, an input width, the number of representation bits, the number of kernels, the number of kernel channels, a kernel height, and a kernel width. Unlike the example of FIG. 4A, the information of each of the first to third sublayers may include, as non-limiting examples, one or more of the iteration count, the number of input channels, the input height, the input width, the number of representation bits, the number of kernels, the number of kernel channels, the kernel height, and the kernel width.

In the example of FIG. 4B, the required operation information of each of the first to third sublayers may include the number of required MACs and the number of operation iterations. The number of required MACs may denote the number of MACs required for a single convolution operation, and the number of operation iterations may denote an iteration count of the convolution operation.

The NN model reconfiguration apparatus 110 may calculate the number of required MACs based on the number of kernel channels, the kernel height, and the kernel width. For example, the NN model reconfiguration apparatus 110 calculates the number of required MACs by multiplying the number of kernel channels, the kernel height, and the kernel width.

Figure 5:
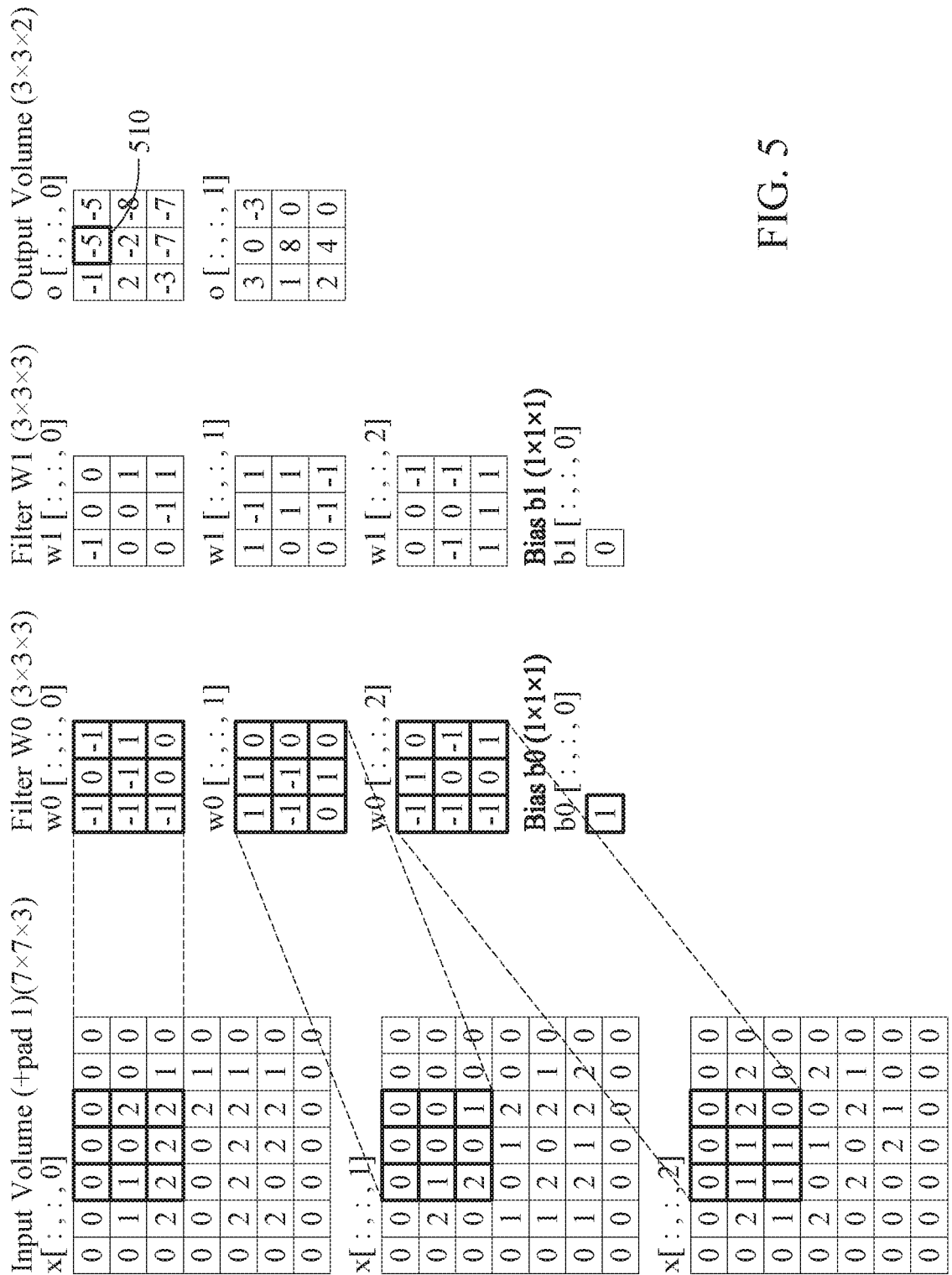

The NN model reconfiguration apparatus 110 may calculate the number of operation iterations based on the iteration count, the number of input channels, the input height, and the input width. For example, the NN model reconfiguration apparatus 110 may calculate the number of operation iterations by multiplying the iteration count, the number of input channels, the input height, and the input width. FIG. 5 illustrates an example of a convolution operation. In the example of FIG. 5, the NN model reconfiguration apparatus 110 may determine that a convolution operation should be iterated 7×7×3×512 times to calculate an output value 510 of a second sublayer.

In the example of FIG. 4B, the required capacity information of each of the first to third sublayers may include an input capacity, a kernel capacity, an output capacity, and a layer-required capacity. Here, the layer-required capacity may denote a memory size (or memory usage) required to perform each sublayer.

The NN model reconfiguration apparatus 110 may calculate the input capacity based on the iteration count, the number of input channels, the input height, the input width, and the number of representation bits. For example, the NN model reconfiguration apparatus 110 calculates the input capacity by multiplying the iteration count, the number of input channels, the input height, the input width, and the number of representation bits.

The NN model reconfiguration apparatus 110 may calculate the kernel capacity based on the number of kernels, the number of kernel channels, the kernel height, the kernel width, and the number of representation bits. For example, the NN model reconfiguration apparatus 110 may calculate the kernel capacity by multiplying the number of kernels, the number of kernel channels, the kernel height, the kernel width, and the number of representation bits.

The NN model reconfiguration apparatus 110 calculates the output capacity based on the iteration count, the input height, the input width, the number of kernels, and the number of representation bits. For example, the NN model reconfiguration apparatus 110 calculates the kernel capacity by multiplying the number of kernels, the number of kernel channels, the kernel height, the kernel width, and the number of representation bits.

The NN model reconfiguration apparatus 110 may calculate the layer-required capacity based on the input capacity, the kernel capacity, and the output capacity. For example, the NN model reconfiguration apparatus 110 calculates the layer-required capacity by adding up the input capacity, the kernel capacity, and the output capacity.

In an example, the NN model reconfiguration apparatus 110 may determine whether the layer corresponds to a reconfiguration target layer to be reconfigured based on the required operation information of the layer of the NN model and the processing core information of the hardware 120. For example, in the example of FIG. 4A, the NN model reconfiguration apparatus 110 determines whether the number of required MACs of each sublayer exceeds the number of MACs per processing core and/or whether "the number of required MACs×the number of operation iterations" (or the number of required MACs) of each sublayer corresponds to a multiple of the number of MACs per processing core. Based on a result of the determining, the NN model reconfiguration apparatus 110 may determine whether each sublayer corresponds to a reconfiguration target layer. The number of required MACs for each of the first and third sublayers may not exceed "1024" that is the number of MACs per processing core described with reference to FIG. 3. Further, "the number of required MACs×the number of operation iterations" of each of the first and third sublayers may correspond to a multiple of "1024". Therefore, the NN model reconfiguration apparatus 110 may determine that each of the first and third sublayers does not correspond to a reconfiguration target layer. The number of required MACs of the second sublayer may exceeds "1024". Further, "the number of required MACs×the number of operation iterations" of the second sublayer does not correspond to a multiple of "1024". Therefore, the NN model reconfiguration apparatus 110 may determine that the second sublayer corresponds to a reconfiguration target layer.

The NN model reconfiguration apparatus 110 may generate a core-aware multi-path layer and a memory-aware multi-path layer corresponding to the second sublayer. The core-aware multi-path layer will be described with reference to FIGS. 6A and 6B below, and the memory-aware multi-path layer will be described with reference to FIGS. 7A and 7B below.

Figure 6A:
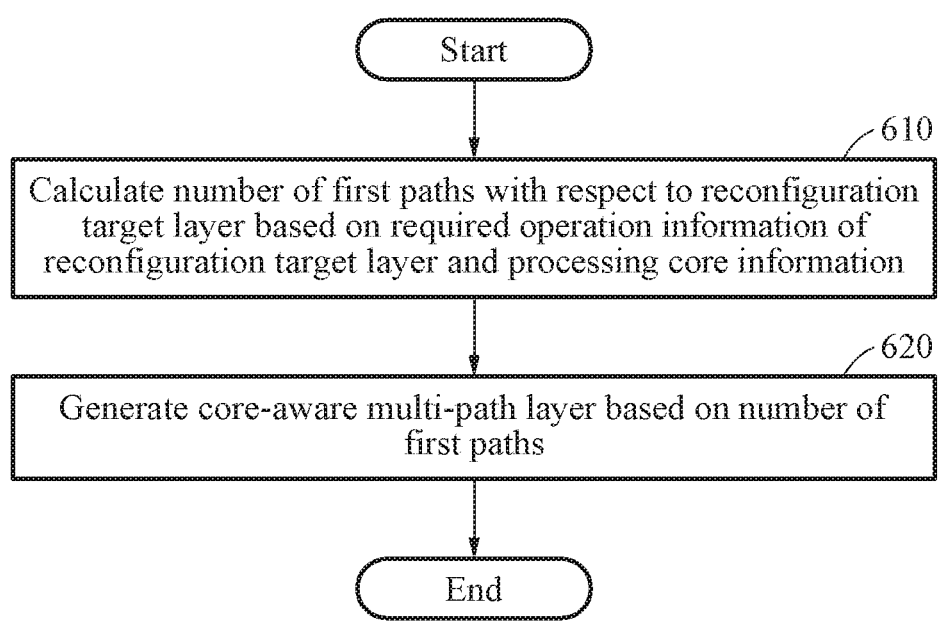

FIG. 6A is a flowchart illustrating an example core-aware multi-layer generation method, in accordance with one or more embodiments. The operations in FIG. 6A may be performed in the sequence and manner as shown. One or more blocks of FIG. 6A, and combinations of the blocks, can be implemented by special purpose hardware-based computer that perform the specified functions, or combinations of special purpose hardware and computer or processor instructions. In addition to the description of FIG. 6A below, the descriptions of FIGS. 1-5 are also applicable to FIG. 6A, and are incorporated herein by reference. Thus, the above description may not be repeated here.

Referring to FIG. 6A, in operation 610, the NN model reconfiguration apparatus 110 calculates the number of first paths with respect to a reconfiguration target layer based on required operation information of the reconfiguration target layer and processing core information of the hardware 120. As described above, if the second sublayer is determined to be a reconfiguration target layer, the NN model reconfiguration apparatus 110 calculates the number of first paths with respect to the second sublayer based on the number of required MACs of the second sublayer and the number of MACs per processing core. For example, the NN model reconfiguration apparatus 110 may determine, to be the number of first paths, "4" that is the quotient obtained when "4608" that is the number of required MACs of the second sublayer is divided by "1024" that is the number of MACs per processing core.

In operation 620, the NN model reconfiguration apparatus 110 may generate a core-aware multi-path layer based on the number of first paths. For example, the NN model reconfiguration apparatus 110 may generate the core-aware multi-path layer corresponding to the second sublayer by applying the number of first paths to the second sublayer. In other words, the NN model reconfiguration apparatus 110 may generate a reconfiguration layer of a multi-path structure by applying the number of first paths to the second sublayer.

The NN model reconfiguration apparatus 110 makes information of the core-aware multi-path layer the same as information of the second sublayer, but makes the number of input channels and the number of kernel channels of the core-aware multi-path layer different from the number of input channels and the number of kernel channels of the second sublayer. In other words, the NN model reconfiguration apparatus 110 may determine the number of input channels and the number of kernel channels of the core-aware multi-path layer by adjusting the number of input channels and the number of kernel channels of the second sublayer.

In an example, referring to FIG. 6B, the NN model reconfiguration apparatus 110 may determine the number of required MACs of the core-aware multi-path layer to be "1024" that is the number of MACs per processing core. The NN model reconfiguration apparatus 110 may determine the number of kernel channels of the core-aware multi-path layer such that 1024 MACs may be used per path of the core-aware multi-path layer. That is, the NN model reconfiguration apparatus 110 may determine, to be the number of kernel channels of the core-aware multi-path layer, "113" calculated by dividing "1024" that is the number of required MACs by the kernel height "3" and by the kernel width "3". Accordingly, the NN model reconfiguration apparatus 110 may enable the core-aware multi-path layer to use 1024 MACs per path. The NN model reconfiguration apparatus 110 may also determine the number of input channels of the core-aware multi-path layer to be "113". An example of the information of the core-aware multi-path layer is illustrated in FIG. 6B.

In the example of FIG. 6B, the number of input channels and the number of kernel channels of the core-aware multi-path layer may be determined by adjusting or changing the number of input channels and the number of kernel channels of the second sublayer based on the number of first paths "4".

The NN model to which the core-aware multi-path layer is applied may have a higher core utilization than the NN model to which the second sublayer is applied. For example, if the core-aware multi-path layer is applied to the NN model, all the MACs may be utilized for each path. Accordingly, the performance of the NN model system 100 may be improved.

Depending on the implementation, a plurality of paths may be implemented in a reconfiguration target layer. In this example, the NN model reconfiguration apparatus 110 may adjust the number of paths of the reconfiguration target layer. For example, the NN model reconfiguration apparatus may calculate the number of first paths according to operation 610, and adjust the number of paths of the reconfiguration target layer to the number of first paths. Accordingly, the NN model reconfiguration apparatus 110 may adjust the number of paths of the reconfiguration target layer such that the MACs in the hardware 120 may be utilized to the maximum.

Figure 7A:
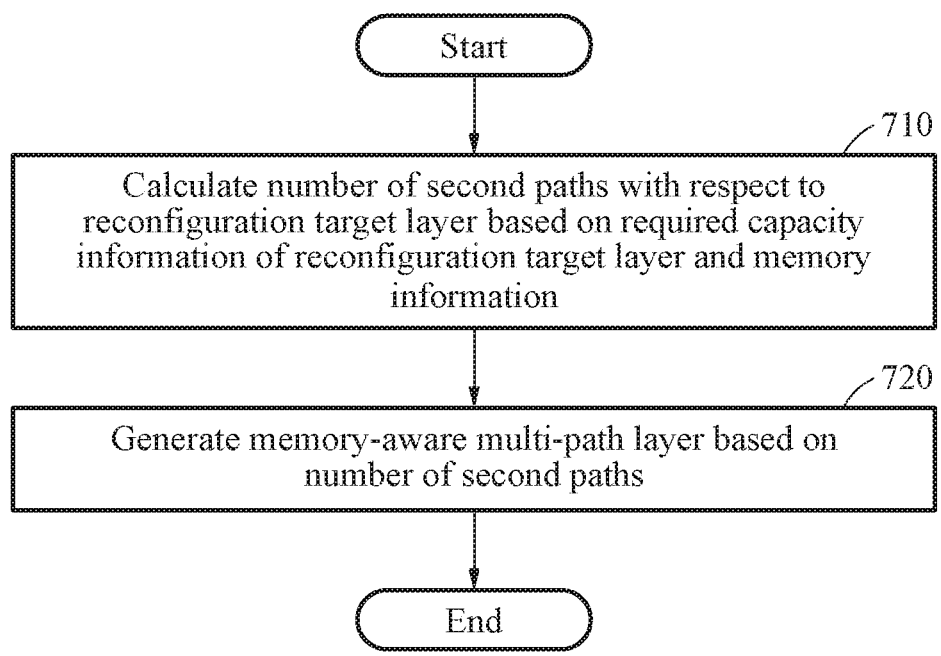

FIG. 7A is a flowchart illustrating an example core-aware multi-layer generation method, in accordance with one or more embodiments. The operations in FIG. 7A may be performed in the sequence and manner as shown. One or more blocks of FIG. 7A, and combinations of the blocks, can be implemented by special purpose hardware-based computer that perform the specified functions, or combinations of special purpose hardware and computer or processor instructions. In addition to the description of FIG. 7A below, the descriptions of FIGS. 1-6B are also applicable to FIG. 7A, and are incorporated herein by reference. Thus, the above description may not be repeated here.

Referring to FIG. 7A, in operation 710, the NN model reconfiguration apparatus 110 calculates the number of second paths with respect to a reconfiguration target layer based on required capacity information of the reconfiguration target layer and memory information of the hardware 120. As described above, if the second sublayer is determined to be a reconfiguration target layer, the NN model reconfiguration apparatus 110 may calculate the number of second paths with respect to the second sublayer based on the layer-required capacity of the second sublayer and the local memory size of the hardware 120. In an example, if the layer-required capacity of the second sublayer is "4a", and the local memory size is "a", the NN model reconfiguration apparatus 110 may determine, to be the number of second paths with respect to the second sublayer, "4" that is the quotient obtained when "4a" is divided by "a". That is, the NN model reconfiguration apparatus 110 may calculate the number of second paths such that the required capacity per path is less than or equal to the local memory size.

In operation 720, the NN model reconfiguration apparatus 110 generates a memory-aware multi-path layer based on the number of second paths. For example, the NN model reconfiguration apparatus 110 may generate the memory-aware multi-path layer corresponding to the second sublayer by applying the number of second paths to the second sublayer. In other words, the NN model reconfiguration apparatus 110 generates a reconfiguration layer of a multi-path structure by applying the number of second paths to the second sublayer.

An example of the information of the memory-aware multi-path layer is illustrated in FIG. 7B.

In the example of FIG. 7B, since four paths may be applied to the memory-aware multi-path layer, the number of input channels and the number of kernel channels of the memory-aware multi-path layer may be determined by adjusting or changing the number of input channels and the number of kernel channels of the second sublayer based on the number of second paths "4".

Additionally, the input capacity of the memory-aware multi-path layer may be ¼ times the input capacity of the second sublayer, and the kernel capacity of the memory-aware multi-path layer may be ¼ times the kernel capacity of the second sublayer.

No data movement or a few data movements may occur between memories in the NN model to which the memory-aware multi-path layer is applied, when compared to the NN model to which the second sublayer is applied. In an example, if the memory-aware multi-path layer is applied to the NN model, the per-path required capacity (or per-path memory usage) may be less than, or equal to, the local memory size. Thus, data processed for each path may be all stored in the local memories 313, 314, 323, and 324, and may not be stored in the shared memories 315 and 325. Accordingly, there may be no data movement between the local memories 313 and 314 and the shared memory 315, and there may be no data movement between the local memories 323 and 324 and the shared memory 325. Thus, the performance of the NN model system 100 may be improved.

Depending on the implementation, there may be a plurality of paths in a reconfiguration target layer. In this example, the NN model reconfiguration apparatus 110 may adjust the number of paths of the reconfiguration target layer. In an example, the NN model reconfiguration apparatus may calculate the number of second paths according to operation 710, and adjust the number of paths of the reconfiguration target layer to the number of second paths. Accordingly, the NN model reconfiguration apparatus 110 may adjust the number of paths of the reconfiguration target layer such that the memories in the hardware 120 may be utilized to the maximum.

Figure 8A:
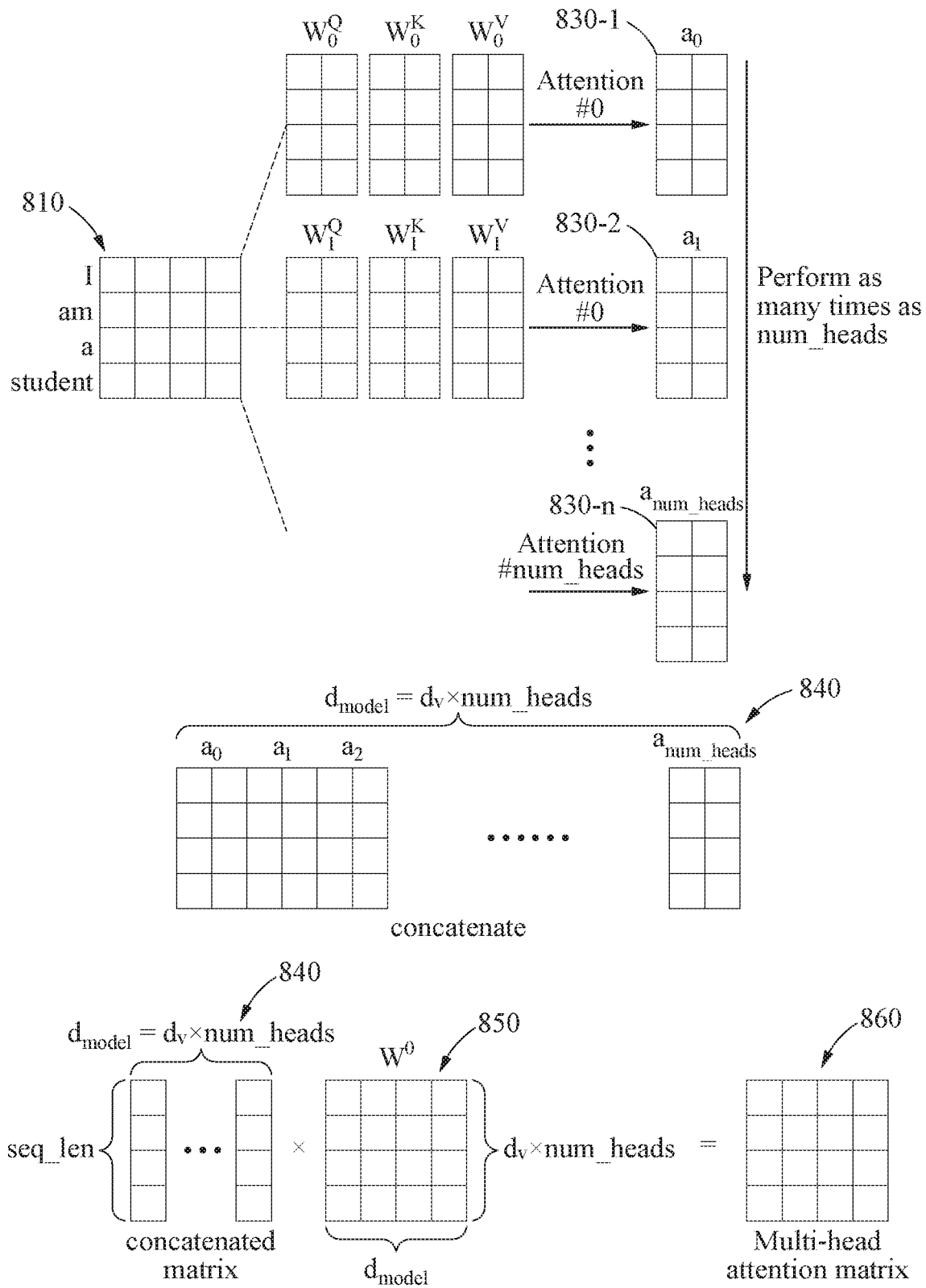

FIGS. 8A and 8B illustrate example operations of NN model reconfiguration apparatus, in accordance with one or more embodiments.

An example of determining reconfiguration layers of a self-attention layer by the NN model reconfiguration apparatus 110 will be described with reference to FIGS. 8A and 8B. Before the description of the example, a self-attention layer will be described.

In the example of FIG. 8A, a self-attention layer (or a transformer of the self-attention layer) generates a plurality of attention value matrices 830-1 to 830-$n$ based on an input 810. Here, n denotes the number of heads, that is, num_head. The self-attention layer generates the attention value matrices 830-1 to 830-$n$ by iterating an attention n times or performing n attentions in parallel. A single attention will be described with reference to FIG. 8B. Referring to FIG. 8B, the self-attention layer generates a matrix Q 820-1, a matrix K 820-2, and a matrix V 820-3 based on the input 810, performs a matrix operation of "the matrix Q 820-1×a matrix $K^T$ 820-2-1", and generates an attention value matrix 830 through a matrix operation of "softmax result×the matrix V 820-3". The self-attention layer generates the attention value matrices 830-1 to 830-$n$ shown in FIG. 8A by iterating such an attention n times or performing n attentions in parallel.

Referring to FIG. 8A, the self-attention layer generates a matrix 840 by concatenating the attention value matrices 830-1 to 830-$n$, and generates a multi-head attention matrix 860 by multiplying the matrix 840 by a weight matrix 850. An example of determining reconfiguration layers of a self-attention layer by the NN model reconfiguration apparatus 110 will now be described.

The NN model reconfiguration apparatus 110 may determine a core-aware multi-path layer of the self-attention layer. There may be a plurality of heads in the self-attention layer as described above, wherein each head may correspond to a path. Accordingly, the NN model reconfiguration apparatus 110 determines the core-aware multi-path layer of the self-attention layer by adjusting the number of heads of the self-attention layer. For example, it is assumed information of the self-attention layer is expressed in Table 1.

TABLE 1

| seq_len | d_model | num_head | d_v = d_model/num_head |
|---------|---------|----------|------------------------|
| a1      | b2      | c1       | d1                     |

In Table 1, seq_len denotes a sequence length indicating the number of words constituting a sentence that may be received by a sequence model including a self-attention layer, d_model denotes the size of a vector expressing a single word, and num_head denotes the number of heads.

The NN model reconfiguration apparatus 110 calculates the number of required MACs of the self-attention layer based on the information of the self-attention layer. For example, the NN model reconfiguration apparatus 110 determines d_v in Table 1 to be the number of required MACs of the self-attention layer. That is, the NN model reconfiguration apparatus 110 determines that d1 MACs are required for the self-attention layer.

In an example, it is assumed that a processing core of the hardware 120 to perform the self-attention layer includes e1 MACs.

The NN model reconfiguration apparatus 110 compares d1 that is the number of required MACs to e1 that is the number of MACs of the hardware 120. In an example, if d1, which is the number of required MACs, is less than e1, which is the number of MACs of the hardware 120, the NN model reconfiguration apparatus 110 may recognize that the self-attention layer does not use the e1 MACs fully. Accordingly, the NN model reconfiguration apparatus 110 changes the number of heads such that the self-attention layer uses the e1 MACs fully. For example, if d_model=4096, num_head=16, d_v=256, and e1=1024, the number of required MACs of the self-attention layer is 256. In this example, the self-attention layer does not use all of the 1024 MACs of the hardware 120. The NN model reconfiguration apparatus 110 changes num_head from "16" to "4". Accordingly, d_v=1024 is satisfied, and the self-attention layer uses all the 1024 MACs of the hardware 120.

In an example, the NN model reconfiguration apparatus 110 determines a memory-aware multi-path layer of the self-attention layer. The NN model reconfiguration apparatus 110 may calculate the number of paths or branches with respect to the self-attention layer based on required capacity information of the self-attention layer and the memory information of the hardware 120, and generates the memory-aware multi-path layer of the self-attention layer based on the calculated number of paths. As described above, since each head of the self-attention layer corresponds to a path, the NN model reconfiguration apparatus 110 generates the memory-aware multi-path layer of the self-attention layer by changing the number of heads to the calculated number of paths.

In an example, the NN model reconfiguration apparatus 110 may determine the required capacity information of the self-attention layer in view of any one or any combination of the matrix Q 820-1, the matrix K 820-2, the matrix V 820-3, and the weight matrix 850. For example, a required capacity (or required memory size) of each of the matrix Q 820-1, the matrix K 820-2, and the matrix V 820-3 is "d_v×seq_len×the number of representation bits", and a required capacity (or required memory size) of the weight matrix 850 is "d_model×seq_len×the number of representation bits". In an example, the number of representation bits is, for example, "8". However, examples are not limited thereto. The NN model reconfiguration apparatus 110 may determine the required capacity information of the self-attention layer by adding up the respective required capacities of the matrix Q 820-1, the matrix K 820-2, the matrix V 820-3, and the weight matrix 850. The NN model reconfiguration apparatus 110 may determine, to be the number of paths with respect to the self-attention layer, "4" that is the quotient obtained when "4a" is divided by "a", if the required capacity of the self-attention layer is "4a" and the local memory size of the hardware 120 is "a". The NN model reconfiguration apparatus 110 generates the memory-aware multi-path layer of the self-attention layer by changing the number of heads of the self-attention layer to the calculated number of paths "4".

In an example, the NN model reconfiguration apparatus 110 determines reconfiguration layers of an attention layer. For example, the NN model reconfiguration apparatus 110 determines a core-aware multi-path layer of the attention layer in view of a matrix multiplication operation performed by the attention layer. Further, the NN model reconfiguration apparatus 110 determines a memory-aware multi-path layer of the attention layer in view of a required memory size of the matrix multiplication operation performed by the attention layer. The description of the self-attention layer applies to this example, and thus a detailed description will be omitted for conciseness.

Figure 9:
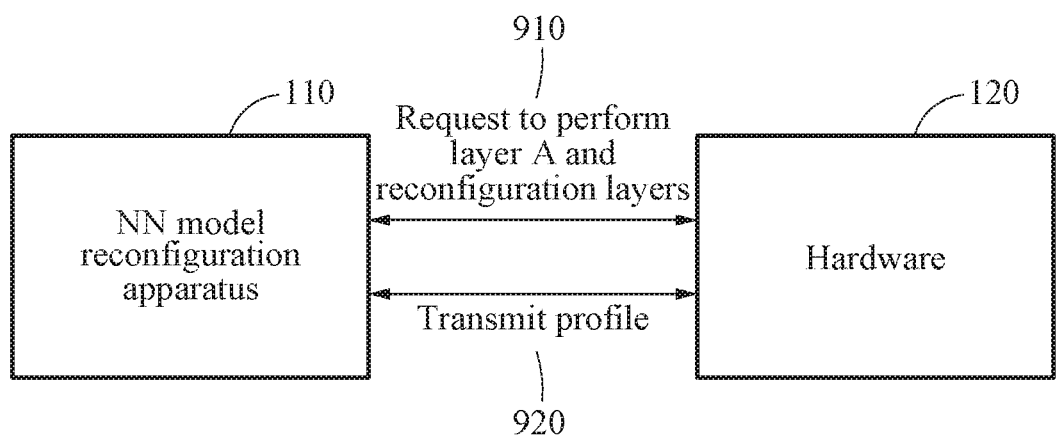
FIG. 9 illustrates an example of selecting one from among a layer and reconfiguration layers by a NN model reconfiguration apparatus, in accordance with one or more embodiments.

FIG. 9 illustrates an example of selecting one from among a layer and reconfiguration layers by a NN model reconfiguration apparatus, in accordance with one or more embodiments.

In the example of FIG. 9, in operation 910, the NN model reconfiguration apparatus 110 requests the hardware 120 to perform a layer A and to perform each of reconfiguration layers.

The hardware 120 performs each of the layer A and the reconfiguration layers.

The hardware 120 (or a profiler in the hardware 120) profiles each of the layer A and the reconfiguration layers. In other words, the hardware 120 (or the profiler in the hardware 120) generates or records performance information of each of the layer A and the reconfiguration layers. The profile (or the performance information) of each of the layer A and the reconfiguration layers includes, for example, any one or any combination of a core utilization, a data movement between memories, a memory usage, and an operation speed. However, examples are not limited thereto.

In operation 920, the hardware 120 (or the profiler in the hardware 120) transmits the profile (or the performance information) of each of the layer A and the reconfiguration layers to the NN model reconfiguration apparatus 110.

The NN model reconfiguration apparatus 110 may select one from among the layer A and the reconfiguration layers using the profile (or the performance information) of each of the layer A and the reconfiguration layers. For example, the NN model reconfiguration apparatus 110 may compare the performance information of the layer A and the performance information of each of the reconfiguration layers, and select a layer having the greatest performance information based on a result of the comparing. If one of the reconfiguration layers is selected, the NN model reconfiguration apparatus 110 applies the selected reconfiguration layer to the NN model.

Figure 10:
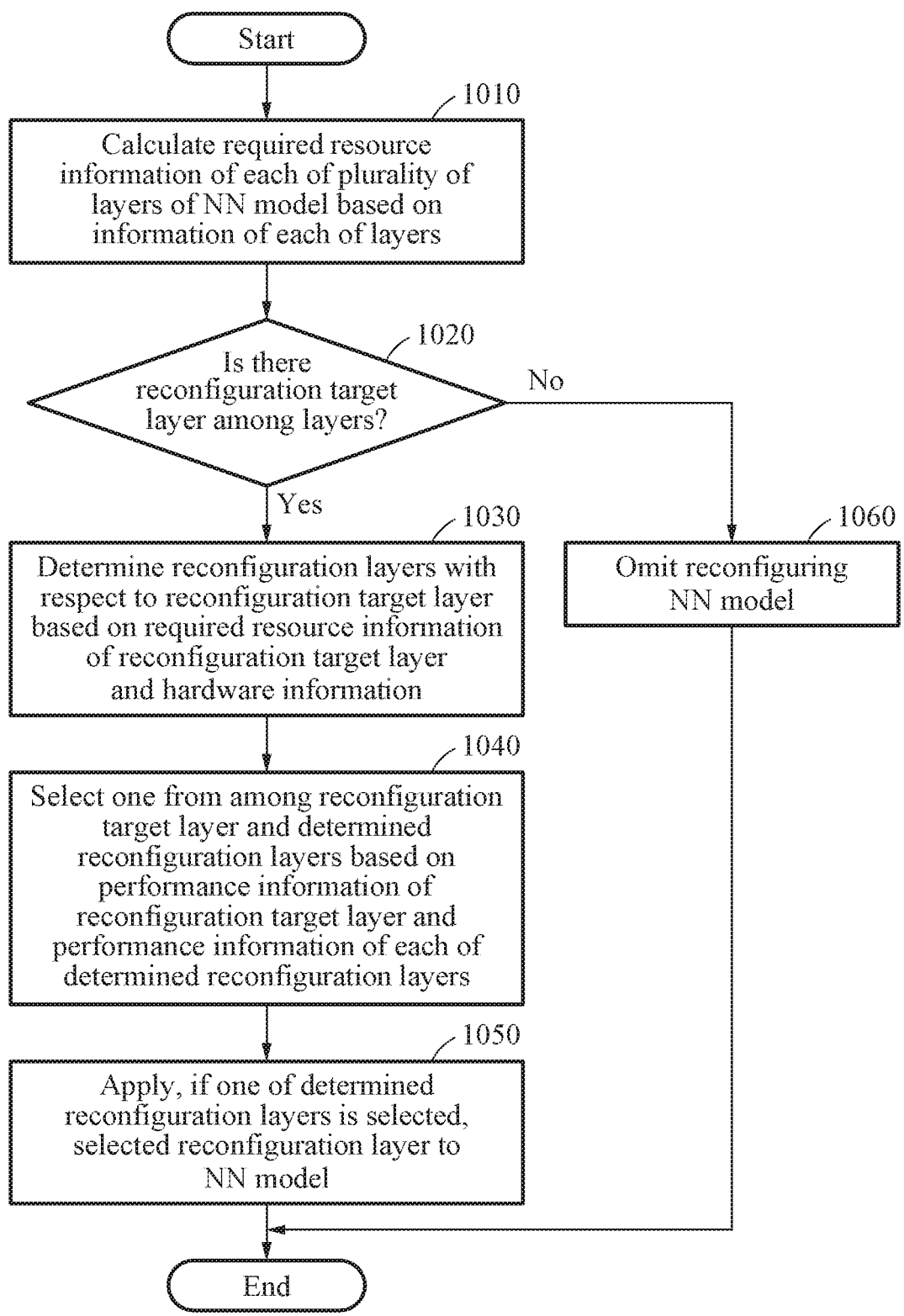
FIG. 10 illustrates an example method of reconfiguring a neural network model, in accordance with one or more embodiments.

FIG. 10 illustrates an example method of reconfiguring an NN model, in accordance with one or more embodiments. FIG. 10 is a flowchart illustrating an example core-aware multi-layer generation method, in accordance with one or more embodiments. The operations in FIG. 10 may be performed in the sequence and manner as shown. One or more blocks of FIG. 10, and combinations of the blocks, can be implemented by special purpose hardware-based computer that perform the specified functions, or combinations of special purpose hardware and computer or processor instructions. In addition to the description of FIG. 10 below, the descriptions of FIGS. 1-9 are also applicable to FIG. 10, and are incorporated herein by reference. Thus, the above description may not be repeated here.

The method described with reference to FIG. 10 is performed by the NN model reconfiguration apparatus 110.

In operation 1010, the NN model reconfiguration apparatus 110 calculates required resource information of each of a plurality of layers of a NN model based on information of each of the layers of the NN model.

In operation 1020, the NN model reconfiguration apparatus 110 determines whether there is a reconfiguration target layer among the layers based on the required resource information of each of the layers and hardware information. For example, the NN model reconfiguration apparatus 110 determines a layer among the layers to be the reconfiguration target layer, if the number of required operators (for example, the number of required MACs) for the layer exceeds the number of operators per processing core or if a product of the number of required operators for the layer and the number of operation iterations is not a multiple of the number of operators per processing core.

In operation 1030, the NN model reconfiguration apparatus 110 determines, if a reconfiguration target layer is determined to be among the layers, reconfiguration layers with respect to the reconfiguration target layer based on required resource information of the reconfiguration target layer and the hardware information. In other words, the NN model reconfiguration apparatus 110 reconfigures the reconfiguration target layer based on the required resource information of the reconfiguration target layer and the hardware information. For example, the NN model reconfiguration apparatus 110 may determine a first reconfiguration layer by applying first multiple paths to the reconfiguration target layer based on required operation information of the reconfiguration target layer and processing core information, and determine a second reconfiguration layer by applying second multiple paths to the reconfiguration target layer based on required capacity information related to the reconfiguration target layer and memory information in the hardware information. The layer may be a convolutional layer. In this example, the first reconfiguration layer is determined by reconfiguring the convolutional layer based on the first multiple paths, and the second reconfiguration layer is determined by reconfiguring the convolutional layer based on the second multiple paths. The number of kernel channels of the first reconfiguration layer is determined based on the number of first multiple paths, and the number of kernel channels of the second reconfiguration layer is determined based on the number of second multiple paths.

In operation 1040, the NN model reconfiguration apparatus 110 selects one from among the reconfiguration target layer and the determined reconfiguration layers based on performance information of the reconfiguration target layer and performance information of each of the determined reconfiguration layers.

In operation 1050, if one of the reconfiguration layers is selected, the NN model reconfiguration apparatus 110 applies the selected reconfiguration layer to NN model.

If there is no reconfiguration target layer among the layers in operation 1020, the NN model reconfiguration apparatus 110 omits reconfiguring the NN model, in operation 1060.

The description provided with reference to FIGS. 1 through 9 also applies to the description of FIG. 10, and thus a detailed description will be omitted for conciseness.

Figure 11:
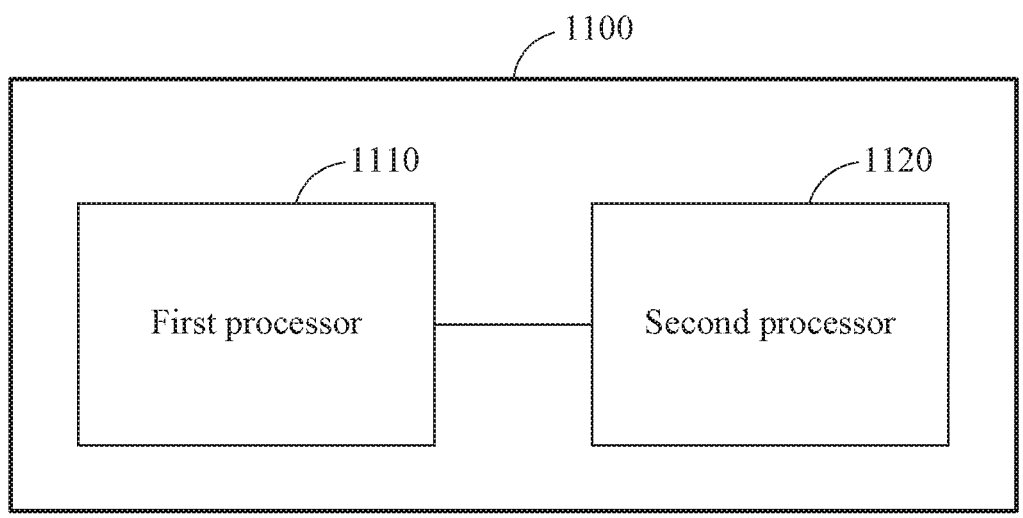
FIG. 11 illustrates an example data processing apparatus.

FIG. 11 illustrates an example of a data processing apparatus 1100. The data processing apparatus 1100 may correspond to a server or a computing device. For example, the data processing apparatus 1100 may be, as non-limiting examples, a personal computer (PC), a server, a mobile device, and the like, and may further correspond to, or be an apparatus provided in, autonomous vehicles, robotics, smartphones, tablet devices, augmented reality (AR) devices, Internet of Things (IoT) devices, and similar devices, which perform voice recognition and image recognition by implementing a neural network, but the present disclosure is not limited thereto, and may correspond to various other types of devices.

Referring to FIG. 11, in an example, data processing apparatus 1100 may include a first processor 1110 and a second processor 1120. However, this is only an example, and the data processing apparatus 1100 may include more than two processors. Each of the first processor 1110 and the second processor 1120 may be respectively representative of one or more processors. In addition, each of the first processor 1110 and the second processor 1120 are representative of one or more memories that may store instructions which, when executed by the first processor 1110 and/or second processor 1120 configure the first processor 1110 and/or the second processor 1120 to perform one or more or all operations described herein.

The data processing apparatus 1100 will also be referred to as a computing device.

The first processor 1110 may implement the NN model reconfiguration apparatus 110 described above. That is, the first processor 1110 may reconfigure the NN model. The second processor 1120 corresponds to an example of the hardware 120 described above. The second processor 1120 may execute the NN model or the reconfigured NN model. FIG. 11 illustrates a single second processor 1120 which is provided as an example only, and a plurality of second processors may execute the NN model or the reconfigured NN model.

The first processor 1110 may calculate required resource information of each of a plurality of layers of the NN model based on information of each of the layers. The first processor 1110 may determine whether there is a reconfiguration target layer among the layers based on the required resource information of each of the layers and hardware information of the second processor 1120. The hardware information includes at least one of memory information and processing core information of the second processor 1120. The memory information includes, for example, at least one of a memory hierarchy structure and a memory (for example, local memory, shared memory, global memory, cache memory, or scratchpad memory) size of the second processor 1120. The processing core information includes, for example, at least one of a number of processing cores in the second processor 1120 and a number of operators per processing core. Here, an operator may correspond to a MAC. However, examples are not limited thereto.

When a determination is made that a reconfiguration target layer is among the layers, the first processor 1110 may determine reconfiguration layers with respect to the reconfiguration target layer based on required resource information of the reconfiguration target layer and the hardware information of the second processor.

The first processor 1110 may select one from among the reconfiguration target layer and the reconfiguration layers based on performance information of the reconfiguration target layer and performance information of each of the reconfiguration layers and applies, if one of the reconfiguration layers is selected, the selected reconfiguration layer to the NN model.

When the NN model is reconfigured by the first processor 1110, the reconfigured NN model is stored.

In an example, the data processing apparatus 1100 may further include a trainer configured to train the reconfigured NN model.

The second processor 1120 may execute the reconfigured NN model. The second processor 1120 may process input data by executing the reconfigured NN model. If an image is input into the second processor 1120, the second processor 1120 may perform operations such as, for example, image recognition or object recognition, by executing the reconfigured NN model. In an example, when a sentence is input into the second processor 1120, the second processor 1120 may perform machine translation by executing the reconfigured NN model. In an example, when a speech signal is input into the second processor 1120, the second processor 1120 may perform speech recognition by executing the reconfigured NN model.

The second processor 1120 may output a result of processing the input data. In an example, when processes such as image recognition or object recognition are performed by executing the reconfigured NN model, the second processor 1120 may transmit an image recognition result or an object recognition result to a user terminal (for example, a smart phone). In an example, when machine translation is performed by executing the reconfigured NN model, the second processor 1120 may transmit a machine translation result to the user terminal. In an example, when speech recognition is performed by executing the reconfigured NN model, the second processor 1120 may transmit a speech recognition result to the user terminal.

The first processor 1110 may reconfigure the NN model (as non-limiting examples, a vision model, or a sequence model) in view of the characteristics of the second processor 1120, and the second processor 1120 may execute the reconfigured NN model, whereby the usage of the second processor 1120 may increase and the processing rate may improve. Accordingly, the overall performance (or accuracy) of the neural network system 100 or the data processing apparatus 1100 described above may also improve.

The description provided with reference to FIGS. 1 through 10 also applies to the description of FIG. 11, and thus a detailed description will be omitted for conciseness.

The neural network model reconfiguration apparatuses, NN model reconfiguration apparatus 110, hardware 120, processor 310, processor 320, data processing apparatus 1100, processor 1110, processor 1120, and other devices, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-11, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

A number of examples have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, comprising:
    calculating required resource information of each of a plurality of layers of a neural network model;
    selecting, a layer from among the plurality of layers as a target layer, based on the required resource information and hardware information of a processing device including one or more processors;
    generating reconfigured layers including first and second reconfigured layers, of the target layer, based on a portion of the calculated required resource information corresponding to the target layer and the hardware information, the first reconfigured layer is generated based on different required resource information than the second reconfigured layer;
    selecting one layer from among the target layer, the first reconfigured layer, and the second reconfigured layer, based on performance information of the target layer and performance information of each of the first and second reconfigured layers; and
    implementing the selected one layer using the processing device,
    wherein the generating of the reconfigured layers comprises:
        generating the first reconfigured layer by applying first multiple paths to the target layer based on required operation information related to the target layer and processing core information in the hardware information; and
        generating the second reconfigured layer by applying second multiple paths to the target layer based on required capacity information related to the target layer and memory information in the hardware information, and
    wherein a total number of the first multiple paths is determined based on the required operation information and a number of processing cores and a total number of the second multiple paths is determined based on the required capacity information and a local memory size.

2. The method of claim 1, wherein the target layer is a convolutional layer,
    the first reconfigured layer is determined by reconfiguring the convolutional layer based on the first multiple paths, and
    a total number of kernel channels of the first reconfigured layer is determined based on the number of first multiple paths.

3. The method of claim 1, wherein the target layer is a convolutional layer,
    the second reconfigured layer is determined by reconfiguring the convolutional layer based on the second multiple paths, and
    a total number of kernel channels of the second reconfigured layer is determined based on the number of second multiple paths.

4. The method of claim 1, wherein the selecting of the target layer comprises selecting a layer among the plurality of layers to be the target layer, when a number of required operators for the selected layer exceeds a number of operators per processing core, or when a product of the number of required operators for the selected layer and a number of operation iterations is not a multiple of the number of operators per processing core.

5. The method of claim 1, wherein the selecting of the one layer comprises:
receiving the performance information of the target layer and the performance information of each of the reconfigured layers from a profiler;
comparing the received performance information of the target layer and the received performance information of each of the reconfigured layers; and
selecting from among the target layer, the first and second reconfigured layers, the one layer having a greater performance information based on a result of the comparing.

6. The method of claim 1, wherein the required resource information of each of the plurality of layers includes at least one of required capacity information, and required operation information of each of the plurality of layers, and
the hardware information includes information related to at least one piece of hardware that executes the neural network model.

7. The method of claim 6, wherein the required operation information of each of the plurality of layers includes at least one of an operation quantity required to perform operations of each of the layers and a number of operators required to calculate a single output value of each of the plurality of layers, and
the required capacity information of each of the plurality of layers includes a memory size required to perform operations of each of the plurality of layers.

8. The method of claim 6, wherein the hardware information includes any one or any combination of a total number of processing cores included in the at least one piece of hardware, a total number of operators per processing core, and a memory size of the hardware.

9. A data processing apparatus, comprising:
a first processor configured to reconfigure a neural network model; and
a second processor configured to implement the reconfigured neural network model,
wherein, for the reconfiguration of the neural network model, the first processor is configured to:
calculate required resource information of each of a plurality of layers of the neural network model;
select, a layer from among the plurality of layers as a target layer, based on the required resource information and hardware information of a processing device including the first processor and the second processor;
generate reconfigured layers including first and second reconfigured layers, of the target layer, based on a portion of the calculated required resource information corresponding to the target layer and the hardware information, the first reconfigured layer is generated based on different required resource information than the second reconfigured layer;
select one layer from among the target layer, the first reconfigured layer, and the second reconfigured layer, based on performance information of the target layer and performance information of each of the generated reconfigured layers, and
implement the selected one layer using the processing device,
wherein, for the generating of the reconfigured layers, the first processor is configured to:
generate the first reconfigured layer by applying first multiple paths to the target layer based on required operation information related to the target layer, and processing core information in the hardware information, and
generate the second reconfigured layer by applying second multiple paths to the target layer based on required capacity information related to the target layer, and memory information in the hardware information, and
wherein a total number of the first multiple paths is determined based on the required operation information and a total number of processing cores and a total number of the second multiple paths is determined based on the required capacity information and a local memory size of the second processor.

10. The data processing apparatus of claim 9, wherein the target layer is a convolutional layer, the first reconfigured layer is determined by reconfiguring the convolutional layer based on the first multiple paths, and a total number of kernel channels of the first reconfigured layer is determined based on the number of first multiple paths.

11. The data processing apparatus of claim 9, wherein the target layer is a convolutional layer,
the second reconfigured layer is determined by reconfiguring the convolutional layer based on the second multiple paths, and
a total number of kernel channels of the second reconfigured layer is determined based on the number of second multiple paths.

12. The data processing apparatus of claim 9, wherein the first processor is configured to select a layer among the plurality of layers to be the target layer, when a number of required operators for the selected layer exceeds a total number of operators per processing core, or when a product of the number of required operators for the selected layer and a total number of operation iterations is not a multiple of the number of operators per processing core.

13. The data processing apparatus of claim 9, wherein, for the selecting of the one layer, the first processor is configured to:
receive the performance information of the target layer and the performance information of each of the reconfigured layers from a profiler,
compare the received performance information of the target layer and the received performance information of each of the reconfigured layers, and
select the one layer from among the target layer, the first and second reconfigured layers, having a greater performance information based on a result of the comparing as the selected one layer.

14. The data processing apparatus of claim 9, wherein the required resource information includes at least one of required capacity information, and required operation information of each of the plurality of layers.

* * * * *